May 13, 1930.  C. S. RICKER  1,758,467
VIBRATION ELIMINATOR
Filed Sept. 2, 1924   2 Sheets-Sheet 1

Chester S Ricker  INVENTOR.

May 13, 1930.  C. S. RICKER  1,758,467
VIBRATION ELIMINATOR
Filed Sept. 2, 1924   2 Sheets-Sheet 2
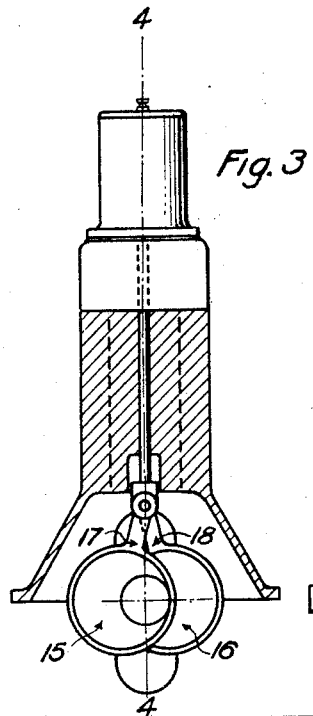
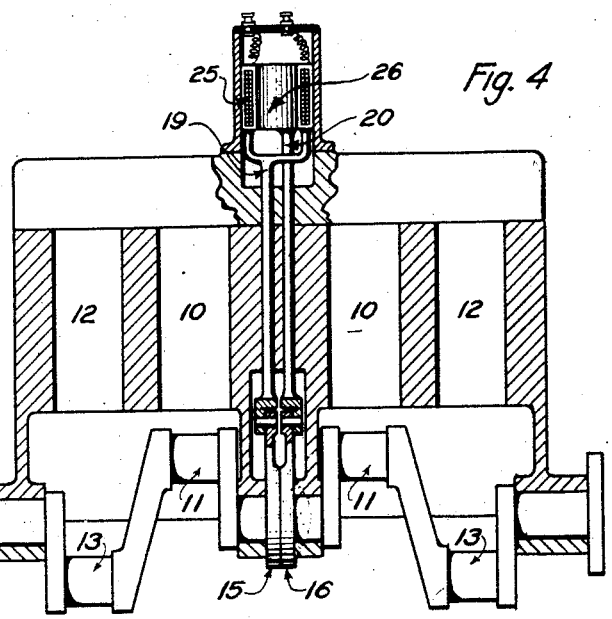
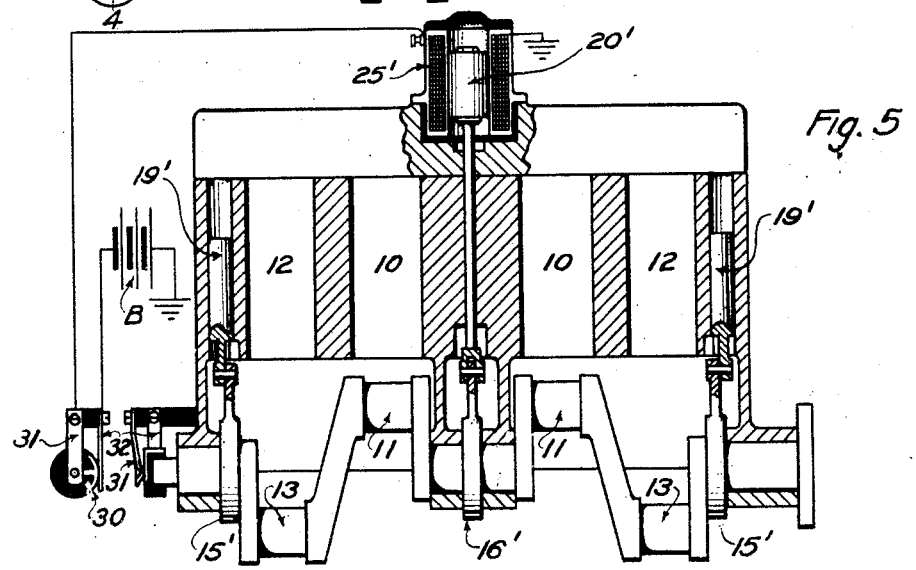
Chester S. Ricker INVENTOR.

Patented May 13, 1930

1,758,467

UNITED STATES PATENT OFFICE

CHESTER S. RICKER, OF INDIANAPOLIS, INDIANA

VIBRATION ELIMINATOR

Application filed September 2, 1924. Serial No. 735,315.

In internal combustion engines or other machines in which parts are reciprocated in a common plane by means of connecting rods and crank shafts, it frequently happens that the primary inertia forces of such reciprocating parts balance each other while the secondary inertia forces due to the angularity of the connecting rod are unbalanced and produce or tend to produce vibration. It is the object of my invention to balance these secondary inertia forces which tend to cause vibration. A further object of my invention is to utilize my balancing means as a source of electric current for charging a battery, such for instance as an automobile storage battery, or for any other purpose.

I accomplish the above objects by providing the machine or engine with a set of reciprocating weights, the primary inertia forces of which balance each other and the secondary inertia forces of which balance the secondary inertia forces of the machine parts; and I utilize one or more of such reciprocating weights as the moving element or elements of a reciprocating electric generator.

In this application I have shown and described my invention as applied to a construction in which the reciprocating balance weights lie on the same side of the crankshaft as do the reciprocating parts which they balance. Another application of my invention is shown in my co-pending application Serial No. 735,316, filed September 2, 1924.

Figure 1:
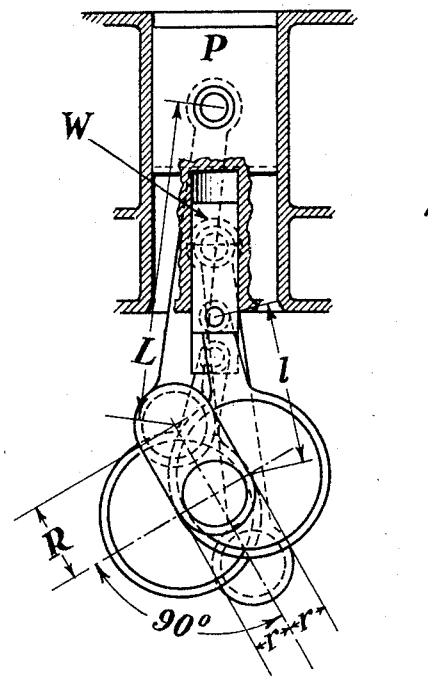
Figure 2:
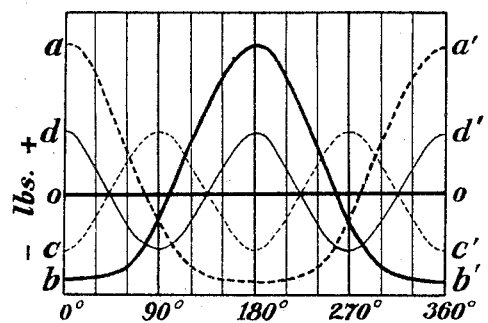

The accompanying drawings illustrate my invention as applied to an internal combustion engine; Fig. 1 is a more or less diagrammatic showing of a set of reciprocating pistons and the set of reciprocating weights which I employ to balance the inertia force of such pistons; Fig. 2 is a chart illustrating the variation in the inertia forces of the reciprocating parts during one revolution of an engine crank shaft; Fig. 3 is a transverse vertical section of an engine embodying my invention; Fig. 4 is a vertical longitudinal section on the line 4—4 of Fig. 3; and Fig. 5 is a vertical longitudinal section of an engine embodying a different arrangement of reciprocating balancing weights.

I have illustrated and described the application of my invention to four-cylinder internal combustion engines in which the four pistons reciprocate in pairs with a difference in phase between the pairs of 180°; but my invention is equally adaptable to other engines such for instance as a V-type, eight cylinder engine, or to other machines in which the secondary inertia forces of reciprocating parts are unbalanced.

In a four-cylinder engine of the type mentioned, the pistons are disposed symmetrically relative to a plane perpendicular to the plane of the engine cylinders. With the pistons so arranged the center of mass of each pair of pistons will be in such plane, and therefore the inertia forces set up by the pistons will also lie in such plane. The inertia forces set up by one pair of pistons will not be exactly balanced by the inertia forces set up by the other pair of pistons, because of the angularity of the connecting rod. This is evident from an inspection of Fig. 2, where the inertia forces are plotted against the angle of crankshaft revolution from the position in which the two pairs of pistons are respectively at the upper and lower ends of their strokes. Curve $a$ represents the inertia forces in the plane of symmetry of that pair of pistons which is at the top of the stroke at 0°, and curve $b$ represents the inertia force in the same plane of that pair of pistons which is at the bottom of the stroke at 0°. These curves are identical except for the fact that they differ in phase by 180°. Owing to the angularity of the connecting rod, neither curve is symmetrical about the horizontal line indicating inertia force of zero pounds. The inertia force of each set of pistons is greater at the top of the stroke than it is at the bottom. The resultant of the forces represented by the curves $a$ and $b$ respectively is indicated by the curve $d$. This curve $d$ is symmetrical about the line O—O, indicating zero pounds force, and it has a 180° period, or half the period of the forces indicated by the lines $a$ and $b$. It is the secondary forces represented by the curve $d$ which are transmitted to the automobile frame and cause it to vibrate.

If the two curves $a$ and $b$ are moved in a horizontal direction for 90° from their position as indicated in Fig. 2, it will be evident that their resultant will also be moved through the same horizontal distance and can be represented by the dotted-line curve $c$. To avoid confusion, the curves representing the forces whose resultant is shown by the curve $c$ are not shown in Fig. 2. The curves $c$ and $d$ balance each other; or, in other words, their resultant is always zero. If we introduce into a four-cylinder engine having two pairs of reciprocating pistons two sets of reciprocating weights of such mass and stroke that their inertia forces can be represented by two curves of the same shape as curves $a$ and $b$ of Fig. 2, and if we time the reciprocation of such weights so that they differ in phase from each other by 180° and from the pistons by 90°, the resultant of the inertia forces of such weights will be a force represented by the curve $c$, which will exactly balance the resultant or secondary force produced by the pistons and represented by the curve $d$.

The shape of the curves $a$ and $b$ is dependent upon the ratio of the length of the connecting rod to the throw of the crankshaft. Using the symbols of Fig. 1, this ratio may be represented as $\frac{L}{R}$. The greater this ratio, the more closely will the curves $a$ and $b$ approach to a true sine curve; and conversely, the smaller the ratio $\frac{L}{R}$, the greater will be the departure of the curves $a$ and $b$ from a true sine curve. For a constant crankshaft speed and a constant $\frac{L}{R}$ ratio, the magnitude of inertia forces set up by a reciprocating body will vary directly as the product of the mass of such body and the length of its stroke. If, therefore, the curves $a$ and $b$ of Fig. 2 represent the inertia forces of two sets of reciprocating pistons, each (set) of mass P, which are connected by connecting rods of length L to a crankshaft of throw R, and if it is desired to produce inertia forces which would be represented by curves identical with curves $a$ and $b$ but spaced 90° therefrom, such forces can be produced by two weights each of mass W which are connected respectively by connecting rods of length $l$ to eccentrics of throw $r$ spaced 180° from each other and 90° from the cranks if the following ratios obtain:

$$\frac{R}{r} = \frac{L}{l} = \frac{W}{P}$$

With the reciprocating parts arranged to have the proportions indicated by the above equations, the inertia forces set up by the reciprocating weights W might be indicated on the chart of Fig. 2 by two curves identical respectively with the curves $a$ and $b$ but spaced 90° from such curves. The resultant of the inertia forces of the weights W will then be represented by the curve $c$, which is symmetrical to the curve $d$ about the line O—O. In other words, the resultant of the inertia forces of the reciprocating weights W will exactly balance the resultant of the inertia forces of the reciprocating pistons P, and there will be no tendency toward external vibration due to unbalanced secondary forces.

In the applications of my invention illustrated in Figs. 3, 4, and 5, one pair of pistons will reciprocate in the cylinders 10 and be connected to the cranks 11, and the other pair of pistons will reciprocate in the cylinders 12 and be connected to the cranks 13. For the sake of clarity, the pistons and connecting rods are not shown in these figures. As the pistons are symmetrically located relative to the central transverse vertical plane of the crankshaft, it will be evident that the resultant of the inertia forces of the pistons will lie in such central transverse vertical plane. In order to avoid the introduction of couples, the reciprocating weights should also be symmetrically located with respect to this transverse vertical central plane. This can be accomplished in many different ways, of which I have illustrated only two.

In Figs. 3 and 4 I have illustrated a construction in which the crankshaft is provided at its central point with two eccentrics 15 and 16 connected respectively by connecting rods 17 and 18 to reciprocating weights 19 and 20 of equal mass. The two eccentrics 15 and 16 are spaced 180° from each other and 90° from the cranks 11 and 12, as is clear from Fig. 3. The reciprocating weights 19 and 20 are so located that their centers of mass are substantially in the plane with respect to which the pistons are symmetrically disposed, so that the resultant of their inertia forces will act in the same line as does the resultant of the inertia forces of the pistons.

In the construction shown in Fig. 5, there are provided two eccentrics 15' corresponding to the single eccentric 15 of Figs. 3 and 4, and there is also provided an eccentric 16' corresponding to the eccentric 16 of Figs. 3 and 4. The two eccentrics 15' are angularly disposed 180° from the eccentric 16' and both eccentrics are disposed at 90° from the cranks 11 and 13. The eccentric 16' reciprocates the weight 20' and the eccentrics 15' reciprocate respectively two weights 19'. The weight 20' is disposed with its center of mass in the vertical central transverse plane of the crank shaft, and the two weights 19' are symmetrically disposed relative to such plane so that their center of mass will lie in such plane. The weights 19' have equal masses, the sum of which equals the mass of the weight 20'.

Fig. 1 can serve as a diagrammatic transverse section of either of the constructions illustrated or of any other similar construction. In order to obtain balancing of the secondary inertia forces of the reciprocating pistons P by the secondary inertia forces of the reciprocating weights W, it is always necessary as was indicated above, that the masses and distances indicated in Fig. 1 have the following relation:

$$\frac{R}{r} = \frac{L}{l} = \frac{W}{P}$$

It will be obvious that my invention can be applied to a V-type eight cylinder engine or to other types in which there are a plurality of banks of cylinders with four cylinders in each bank. In such type, a set of reciprocating weights arranged in the manner described may be provided for each bank of cylinders to reciprocate in the plane of such bank.

The reciprocating mass or masses 19, 20, and 20', can be used for the production of an electric current. Two methods of accomplishing this are illustrated in Figs. 4 and 5. In the arrangement shown in Fig. 4, the reciprocating weight 19 may include a coil 25 and the reciprocating weight 20 may include a portion 26 of magnetic material, with or without windings, which when reciprocating within the coil 25 will induce an electric current therein. In the construction illustrated in Fig. 5, a stationary coil 25' is provided, within which the weight 20' of magnetic material may reciprocate and by its reciprocation induce an electric current in the coil 25'. The current induced in the coil 25' will of course be alternating in nature, and it is therefore necessary to insert some form of commutator between the coil 25 or 25' and the battery B if the generator current is used to charge such battery, although the commutator may be omitted in other instances where an alternating current is desirable. I have shown a commutator mounted on the end of the crank shaft and consisting of a single segment 30 which closes the circuit through the coil 25' and the battery B by means of the brushes 31 and 32 only when the current in the coil 25' is in the right direction to charge the battery B.

The reciprocating weights need not be used for the generation of electric current, or in fact for any purpose whatever except for that of counter-balancing the secondary inertia forces of the reciprocating pistons.

I claim as my invention:

1. In combination with an engine crankshaft having two sets of cranks spaced 180° apart, a set of pistons connected by connecting rods of equal length to each set of said cranks, said sets of pistons being of equal mass and reciprocating in a common plane on one side of said crankshaft, and two weights of equal mass adapted to reciprocate in the same plane and on the same side of said crankshaft as do said pistons, said weights being connected to said crankshaft by connecting rods of equal length which are attached to said crankshaft at eccentric points spaced 180° apart and 90° from the cranks to which the connecting rods of the pistons are attached, the ratio between the mass of said weights and that of said pistons being inversely proportional to the strokes through which they respectively reciprocate and the ratio of the stroke of said weights to the length of the connecting rods of the weights being equal to the ratio of the stroke of said pistons to the length of the connecting rods of the pistons.

2. In combination with an engine crankshaft having two sets of cranks spaced 180° apart, a set of pistons connected by connecting rods of equal length to each set of said cranks, said sets of pistons reciprocating in a common plane on one side of said crankshaft, and two weights adapted to reciprocate in the same plane and on the same side of said crankshaft as do said pistons, said weights being connected to said crankshaft by connecting rods of equal length which are attached to said crankshaft at eccentric points spaced 180° apart and 90° from the cranks to which the connecting rods of the pistons are attached, the ratio of the stroke of said weights to the length of the connecting rods of the weights being equal to the ratio of the stroke of said pistons to the length of the connecting rods of the pistons.

3. In combination with an engine crankshaft having two sets of cranks spaced 180° apart, a set of pistons connected by connecting rods to each set of said cranks, said sets of pistons being of equal mass and reciprocating in a common plane on one side of said crankshaft, and two weights of equal mass adapted to reciprocate in the same plane and on the same side of said crankshaft as do said pistons, said weights being connected to said crankshaft by connecting rods which are attached to said crankshaft at eccentric points spaced 180° apart and 90° from the cranks to which the connecting rods of the pistons are attached, the ratio between the mass of said weights and that of said pistons being inversely proportional to the strokes through which they respectively reciprocate.

4. In combination with an engine crankshaft having two sets of cranks spaced 180° apart, a set of pistons connected by connecting rods to each set of said cranks, said sets of pistons reciprocating in a common plane on one side of said crankshaft, and two weights adapted to reciprocate in the same plane and on the same side of said crankshaft as do said pistons, said weights being connected to said crankshaft by connecting rods which are attached to said crankshaft at eccentric points spaced 180° apart and 90° from the cranks to which the connecting rods of the pistons are attached.

5. In combination, a crankshaft having two cranks spaced 180° apart, a reciprocating body attached to each crankshaft crank by a connecting rod, said reciprocating bodies being arranged to reciprocate in a common plane on one side of said crankshaft, and two reciprocating balance weights arranged to reciprocate in the same plane and on the same side of said crankshaft as do said reciprocating bodies, said balance weights being connected to said crankshaft by connecting rods which are attached to said crankshaft at points spaced 180° apart and 90° from the cranks to which said reciprocating bodies are attached.

6. In an internal combustion engine having four cylinders in a plane, pistons in said cylinders, a crankshaft having four cranks arranged in two sets spaced 180° apart, and connecting rods connecting said pistons to said crank; the combination of two reciprocating weights arranged to reciprocate in the plane of said cylinders and connected respectively to said crankshaft by connecting rods which are attached to said crankshaft at eccentric points spaced 180° apart and 90° from the crankshaft cranks.

7. The combination set forth in claim 6 with the addition that said weights are symmetrically disposed longitudinally of said crankshaft relative to said pistons.

In witness whereof, I have hereunto set my hand at Indianapolis, Indiana, this 27th day of August A. D. one thousand nine hundred and twenty-four.

CHESTER S. RICKER.